United States Patent [19]
Kikinis

[11] Patent Number: 5,790,644
[45] Date of Patent: Aug. 4, 1998

[54] COMPUTER-TO-TELEPHONE INTERFACE

[75] Inventor: Dan Kikinis, Saratoga, Calif.

[73] Assignee: Elonex I.P. Holdings, Ltd., London, United Kingdom

[21] Appl. No.: 725,183

[22] Filed: Oct. 1, 1996

Related U.S. Application Data

[63] Continuation of Ser. No. 446,440, Jul. 14, 1995, abandoned, which is a continuation of Ser. No. 58,922, May 7, 1993, abandoned.

[51] Int. Cl.$^6$ .................. H04M 17/00; H04M 1/00
[52] U.S. Cl. .................. 379/144; 379/355; 379/356
[58] Field of Search .................. 379/96, 97, 98, 379/99, 142, 144, 354, 355, 356, 357, 91.01, 93.05, 93.06, 93.23, 110.01

[56] References Cited

U.S. PATENT DOCUMENTS

| | | | |
|---|---|---|---|
| 4,201,887 | 5/1980 | Burns | 379/99 |
| 4,471,165 | 9/1984 | Defino | 379/99 |
| 4,503,288 | 3/1985 | Kessler | 379/357 |
| 4,517,412 | 5/1985 | Newkirk | 379/144 |
| 4,661,659 | 4/1987 | Nishimura | 379/99 |
| 4,817,135 | 3/1989 | Winebaum | 379/355 |
| 4,837,808 | 6/1989 | Immendorfer | 379/96 |
| 4,860,342 | 8/1989 | Danner | 379/354 |
| 4,862,498 | 8/1989 | Reed | 379/355 |
| 4,926,464 | 5/1990 | May | 379/99 |
| 4,991,199 | 2/1991 | Purekh | 379/110.1 |
| 4,995,077 | 2/1991 | Malinowski | 379/355 |
| 5,119,414 | 6/1992 | Izumi | 379/110.1 |
| 5,163,086 | 11/1992 | Ahearn | 379/144 |
| 5,181,744 | 1/1993 | Betheil | 379/355 |
| 5,297,196 | 3/1994 | Yamada | 379/99 |
| 5,359,651 | 10/1994 | Draganoff | 379/354 |
| 5,455,857 | 10/1995 | McGuire | 379/355 |
| 5,455,858 | 10/1995 | Lin | 379/354 |
| 5,467,385 | 11/1995 | Reuben | 379/142 |

FOREIGN PATENT DOCUMENTS

| | | | |
|---|---|---|---|
| 0073847 | 3/1989 | Japan | 379/357 |
| 0277043 | 11/1989 | Japan | 379/354 |
| 0019380 | 1/1991 | Japan | 379/357 |

*Primary Examiner*—Steven J. Saras
*Assistant Examiner*—Vijay Shankar
*Attorney, Agent, or Firm*—Donald R. Boys

[57] ABSTRACT

A portable computer, such as a laptop, notebook, or palmtop computer, comprises control routines for providing a sophisticated touch-tone dialer operable through an existing or supplied output speaker, enabling calls to be routed without making a wired direct connection between the telephone equipment and the computer. In one embodiment a system is provided for transmitting computer-usable data over a phone connection through a pre-stored relationship between DTMF tones and ASCII code.

8 Claims, 11 Drawing Sheets

Fig. 8

|   | 1 | 2 | 3 | 4 | 5 | 6 | 7 | 8 | 9 | 0 | * | # | A | B | C | D |
|---|---|---|---|---|---|---|---|---|---|---|---|---|---|---|---|---|
| 1 | A | B | C | D | E | F | G | H | I | J | K | L | M | N | O | P |
| 2 | Q | R | S | T | U | V | W | X | Y | Z | a | b | c | d | e | f |
| 3 | g | h | i | j | k | l | m | n | o | p | q | r | s | t | u | v |
| 4 | w | x | y | z | 0 | 1 | 2 | 3 | 4 | 5 | 6 | 7 | 8 | 9 | SP | _ |
| 5 | = | # | $ | % | & | - | _ | ) | * | + | . | , | . | / | .. | ... |
| 6 | v | = | > | ? | @ | [ | \ | ] | < | = | . | { | _ | } | ~ | |
| 7 | BEL | BS | CAN | CR | DC1 | DC2 | DC3 | DC4 | DEL | DLE | EM | ENQ | EOT | ESC | ETB | ACK |
| 8 | GS | H. | LF | NAK | NUL | RS | SI | SO | SOH | STX | SUB | SYN | US | VT | | FF |
| 9 | | | | | | | | | | | | | | | | |
| 0 | | | | | | | | | | | | | | | | |
| * | | | | | | | | | | | | | | | | |
| # | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |

COMPUTER-TO-TELEPHONE INTERFACE

This is a continuation of application Ser. No. 08/446,440 filed Jul. 14, 1995, now abandoned which is a continuation of application Ser. No. 08/058,922 filed May 7, 1993, now abandonded.

FIELD OF THE INVENTION

The present invention is in the area of computer system, and pertains more specifically to protable systems and to apparatus and methods for interfacing such systems to telephone equipment.

BACKGROUND OF INVENTION

Dialer devices are used to generate Dual Tone Multi-Frequency (DTMF) audio signals that are transmitted over telephone lines and used to activate switching equipment over route phone calls. Small, portable dialer devices consist of an electronic tone generator coupled with a circular keying arrangement. They typically have a calculator-type integrated transistor circuitry and are encased with a sensitive microphone in a plastic holder. Such a dialer device replaces the transmitter element in a phone handset.

The top of the typical dialer has a set of push-button, Touchtone™ key pads which activate DTMF signals that cause automatic dialing of phone numbers. (Touchtone is trademarked by the American Telephone and Telegraph Company.) There are twelve key pads corresponding to the digits 0 through 9, the star symbol (*), and the pound symbol (#). Some dialers have four additional keys, designated A, B, C, and D.

The DTMF system of touchtone dialing uses internationally standardized combinations of frequencies. Table 1 is a matrix showing the high and low frequency pair, in Hz, required for each of the 16 characters in a full key pad configuration. Each character from the touchtone keypad is represented by a dual set of audio frequency signals, which when transmitted together are recognized by other electronic equipment as the unique representation of the keypad character.

TABLE 1

| Lower Frequency (Hz) | Higher Frequency (Hz) | | | |
|---|---|---|---|---|
| | 1209 | 1336 | 1447 | 1633 |
| 697 | 1 | 2 | 3 | A |
| 770 | 4 | 5 | 6 | B |
| 852 | 7 | 8 | 9 | C |
| 941 | * | 0 | # | D |

Business persons have often carried the above-described dialer devices, also known as tone dial converters, to access their branch office computers from rotary (pulse) lines. Until recently tone dial converters were available from many phone outlet and hobby stores. Now that most public phone equipment has been converted to touchtone equipment, the use of these devices is not as common. However, the technology of DTMF tone conversion they perform may have other important Coupling one computer to another in a distant location usually involves some form of modem. A modem is circuitry that modulates a carrier wave so digital data can be transmitted over an analog communications line, typically computer-to-computer over a phone line. Modulation alters one or more of the frequency, amplitude, and phase of the carrier wave with respect to time according to a known protocol related to the digital values. A receiving modem reconverts (demodulates) the carrier wave to digital data for use by another computer or computerized receiving device.

Primary types of modems are: voice-band—those that are used on voice-grade public phone lines (also known as as dialup modems); acoustic coupler—those that permit a user to dial a phone number, listen for a signal from the other end of the line, and press the telephone receiver into two cushioned cups on the acoustic coupler; and direct connect—those that plug directly into the phone network.

Many times because of limited access to phone jacks in public places and the electrical connections required, it is difficult if not impossible for the user to set up a coupler or modem. It is not uncommon to spend more time making the necessary electrical connections than is spent actually transmitting and/or receiving data.

What is needed is a means of easily communicating by use of a portable computer through a phone network without the need to set up a modem and physically secure a phone line connection. Also, the technology of converting DTMF tones is presently limited to that of the 16 keys on a phone touchtone pad. The expansion of DTMF tone conversion to include the entire ASCII code set would open the door to the transfer of computer code directly through such a portable computer-phone interface.

BRIEF DESCRIPTION OF THE DRAWINGS

FIG. 8 is a matrix relating ASCII code to DTMF signals for the embodiment of the invention depicted in FIG. 7.

SUMMARY OF THE INVENTION

A telephone dialing system is provided according to a preferred embodiment of the present invention comprising memory means for storing telephone dialing data comprising long-distance carrier access numbers and user credit card numbers, and selection means for selecting a telephone number to be called, including area code. There is additionally retrieval means for combining the telephone number to be called with the long-distance carrier access numbers and the user credit card numbers in a sequence of numbers for dialing a long-distance credit-card call, and audio output means for generating dual-tone multiple-frequency (DTMF) signals corresponding to the combined sequence of numbers and for driving a speaker to interface to a telephone audio receiver to dial the credit-card call.

In a preferred embodiment the telephone dialing system comprises a general-purpose portable computer with control routines providing a user interface by menus on a display screen of the computer, the menus providing entry fields for data and initiation signals for dialing.

In another aspect of the invention, in addition to dialing, computer operable code is transmitted over voice-quality telephone lines by generating ASCII coded data, relating the ASCII code to coupled DTMF tones, transmitting the coupled DTMF tones, and decoding the tones back to ASCII data at a receiving computer. An add-on card is provided for receiving and translating coupled DTMF tone coded data.

In yet another aspect an audio enhancement device is provided to enhance the quality of poor quality speakers in existing portable computers to a quality sufficient to reliably operate touch-tone telephone equipment.

The present invention provides a specialized "dialer" which is unique in several ways. It provides a means for remote computer-to-computer communication not requiring a modem or coupler nor any line connection between computer and phone. The DTMF audio signals are simply output from the computer's speaker and picked up by the phone handset, which is held next to the speaker. Also the invention extends the concept of DTMF tone generation as employed by the described dialer and includes through its control routines a capability to translate the entire set of American Standard Code for Information Interchange (ASCII) code into DTMF tone signals, affording an entirely new way to transmit computer code over voice quality phone lines.

DESCRIPTION OF THE PREFERRED EMBODIMENTS

Figure 1:
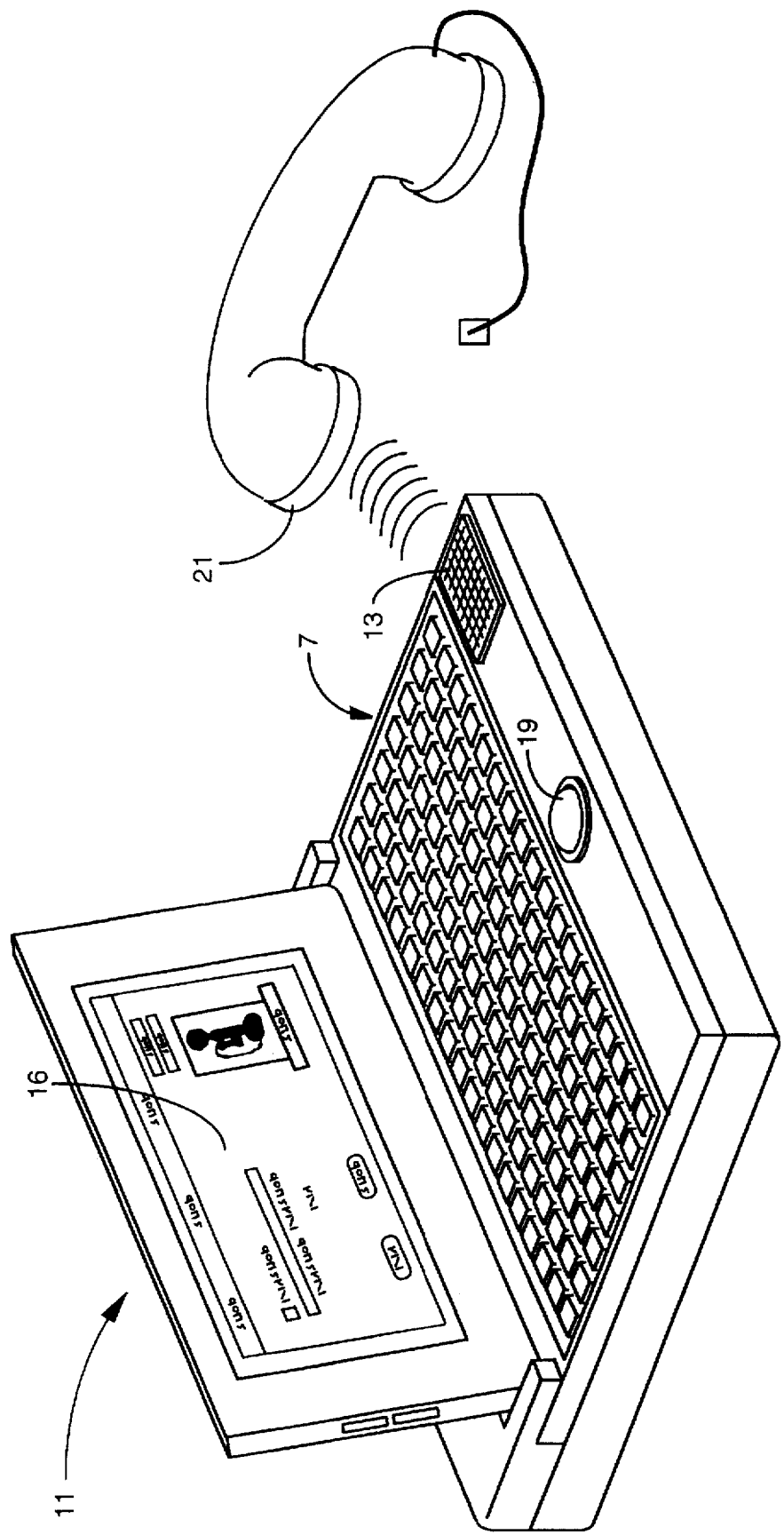
FIG. 1 is an isometric view of a portable computer and phone interface according to an embodiment of the invention.

FIG. 1 is an isometric view of a notebook computer 11 comprising an embodiment of the present invention. The general purpose computer system supporting the embodiment of the dialer invention is conventional and preferably is in the form of a portable notebook, laptop, or palmtop computer, such as notebook computer 11. The enhanced control routines of the invention provide a user interface display 16. A user can specify and select call numbers and other information by using keyboard 17. Some portable computers have a built-in pointer device, such as trackball 19, which selects menu items and moves a screen cursor on the interface display of the invention, more fully described below.

To make a call using this embodiment, the user activates the dialer applications by input to keyboard 17. The user then selects a number to be called and initiates the call from interface display 16. The invention's control routines recall the user's credit card information, previously programmed by in memory, and the selected call number. The system translates the digital data into the corresponding DTMF signals necessary to dial the number. The DTMF signals are those produced from a standard twelve-button touch-tone telephone key pad (see description under "Background of the Invention.") The string of DTMF signals is output in this embodiment through the computer's speaker 13 and are picked up through phone mouthpiece 21, held near the speaker, causing the call to be dialed.

The computer-driven "dialer" according to the present embodiment requires no line connection with the phone. The user simply holds the phone handset's mouthpiece near the computer speaker to make the call. This provides "on-the-road" portable computer users with a capability to conveniently dial and communicate from phone booths, motel phones, and in other up-to-now impossible situations without the use of a modem. For the traveler the inconvenience of having to set up a modem with electrical connections into a telephone network often will preclude its use. Also most motel rooms and public phones do not have phone jacks. The dialer invention therefore presents a considerable advantage to the computer user—there is no wiring setup required— and it can be used on any public phone without a phone jack.

An important feature of the embodiment shown by FIG. 1 is user interface display 16, which provides a flexible interface to easily operate and edit variable information for the dialer. The interface is provided in this embodiment through menus as presented in FIGS. 2A, 2B, 2C, 2D, and 2E.

Figure 2A:
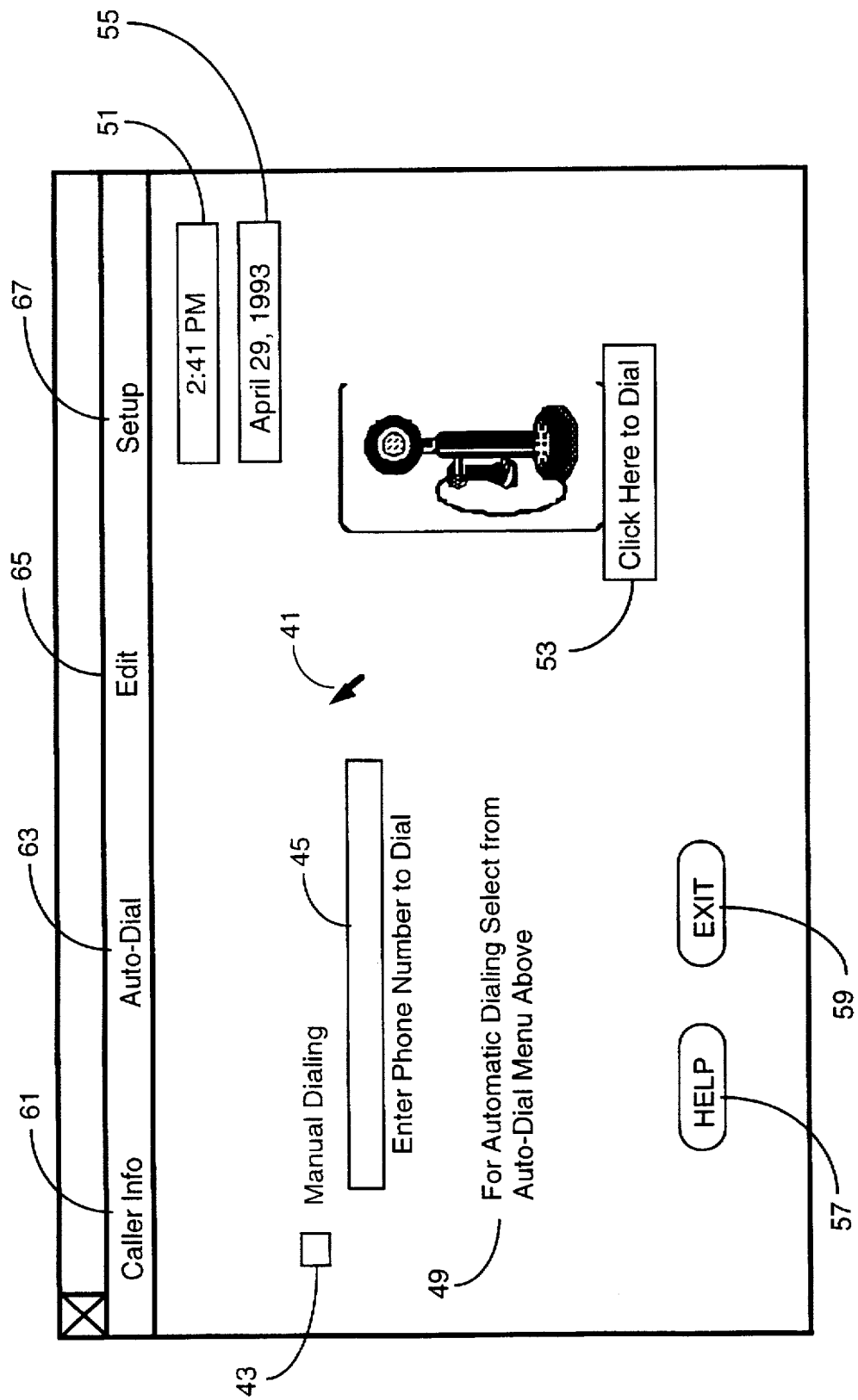
FIG. 2A shows an opening menu screen in an embodiment of the present invention.

FIG. 2A is a screen format for an opening menu in the present embodiment. The opening menu is presented when the dialer application is activated from the operating system by user signal. In the display, the user can point and select by moving a cursor 41 with pointer device 19 or by using the keyboard arrow keys to move the cursor and pressing the <Enter> or <Return>) key to make the selection. When the user selects a box having an entry field, the field is activated to accept keyboard input in the manner of an editor or word processor application. The mechanisms of these operations are familiar to those with skill in the art.

"Manual dial" box 43 can be selected if the user wants to manually enter the number for a call. Entry field 45 becomes active and displays the number entered. When the correct number is displayed, the user initiates the call by selecting "Click Here to Dial" box 53.

For automatic dialing, the user is directed by message 49 to use Dial List menu 63 (as described below in FIG. 2C) to select a number to be called. Adjunct items on the opening menu (FIG. 2A) are date 55, local time 51, Help option 57, and Exit option 59. Other user aids may be provided in other embodiments as menu items.

Along the top of the screen of FIG. 2A are four menu selections—Caller Info 61, Auto-Dial 63, Edit 65, and Setup 67. These selections provide the user with means to quickly enter and change call information and the hardware setup. The user accesses a menu by clicking with the mouse on the menu name or by typing the first letter of the name. Display screen initiated by selecting from the menu bar are shown in FIGS. 2B through 2E.

Figure 2B:
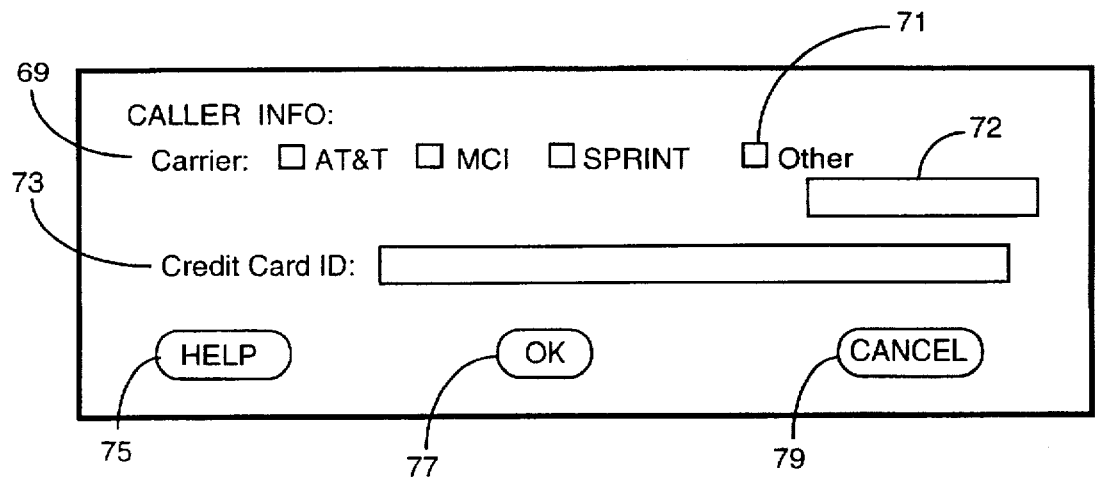
FIG. 2B shows a Caller Input screen for an embodiment of the invention.

FIG. 2B shows a CALLER INFO menu initiated by selecting 61 in FIG. 2A, which lets the user specify or change his or her phone credit card information. The user selects one of the major carriers, such as "ATT," "MCI," or "SPRINT" in line 69. In other embodiments the carrier list might be expanded. The system responds by automatically defining the carrier access number, which may be a 1-800 number, to be combined later with other data in dialing. If the user has a carrier other than the ones listed, he/she may select "Other" box 71 and then enter the carrier access number in box 72. The user enters his/her call credit card identification on "Credit Card ID" line 73. A Help option 75 is available. The user can abandon the menu and any changes made to its items at any time by selecting Cancel option 79. The user selects OK option 77 to save the caller information entered. The specified carrier access number and credit card identification remain in effect unless changed through the CALLER INFO menu in this embodiment of the invention.

Figure 2C:
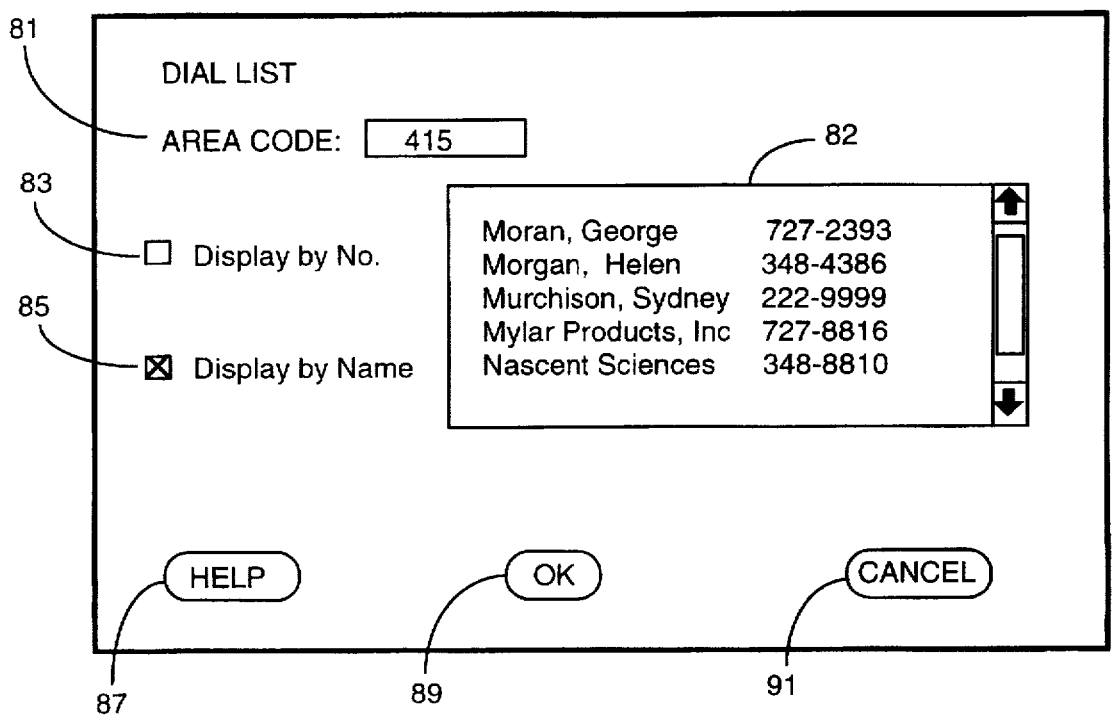
FIG. 2C shows a Dial List screen for an embodiment of the invention.

FIG. 2C shows a DIAL LIST menu activated by selecting 63 in the menu of FIG. 2A. This menu allows the user to display the list of phone numbers currently stored in computer memory and select a number to be called. The lists are accessed in this embodiment by call area code. The user first enters the desired area code on "Area code:" line 81. In an alternative embodiment, area codes are displayed in a scrolling list, and the user may select from the list. The user can display the stored numbers for the selected area code either by phone number or alphabetically by name by selecting Display by Number box 83 or Display by Name box 85. Names and numbers are displayed in a scrolling list 82 operated by a conventional scroll bar. Five phone number-name pairs are displayed numerically in order at a time. The name can be that of an individual (last name,first name), company, or a code identifier—whatever the user chooses to identify the party to be called.

The user scrolls through the list by moving the up/down scroll arrows with pointer device or keyboard. The user then selects the number to dial and the selected number-name pair is highlighted. A Help option 87 is available.

When the user is done with the DIAL LIST menu, OK option 89 is selected. The screen may be exited without altering dial number selection by selecting Cancel option 91. The system returns the user to the opening menu (FIG. 2A).

Figure 2D:
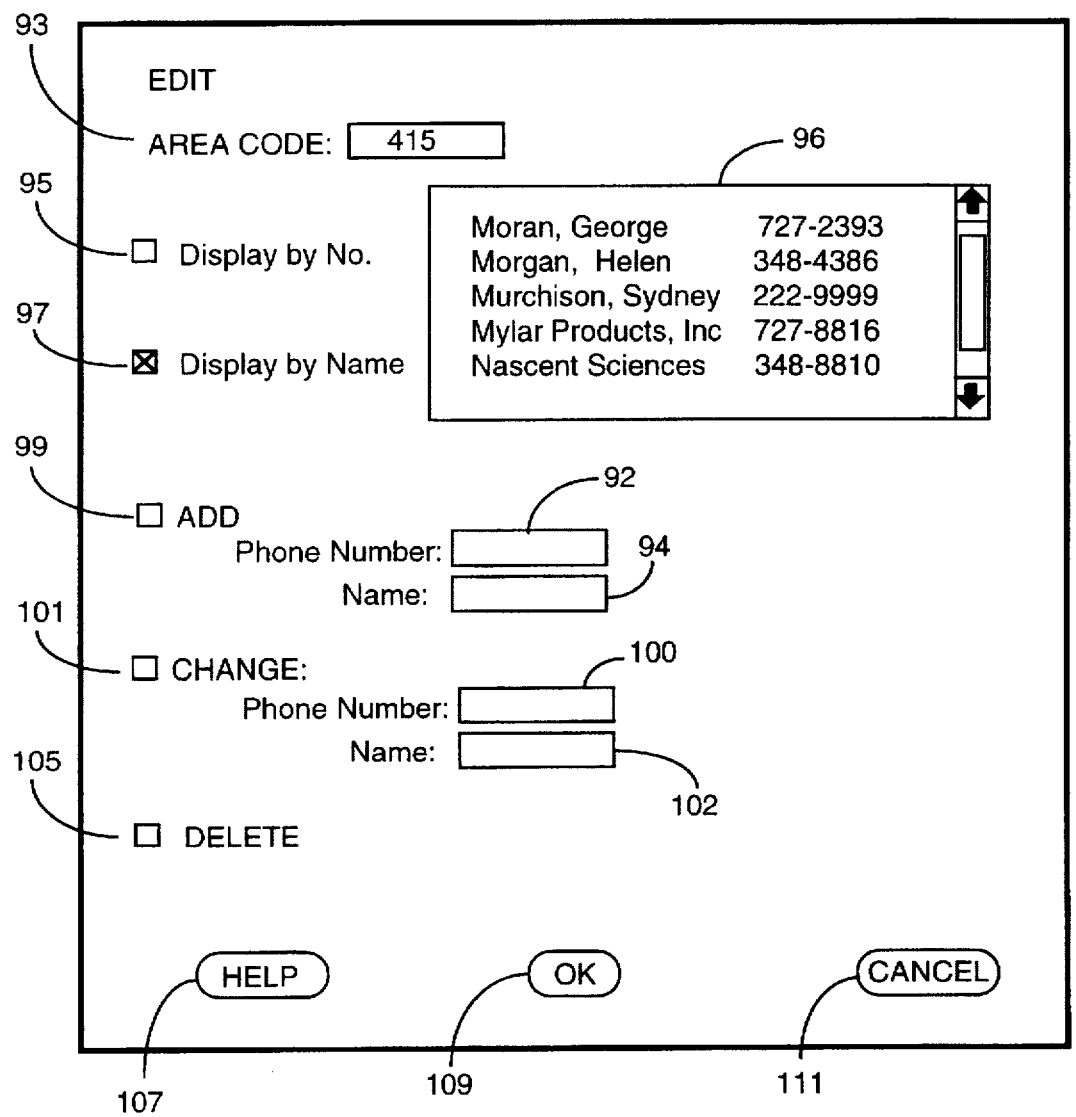
FIG. 2D shows an Edit screen according to an embodiment of the invention.

FIG. 2D shows an Edit menu activated by selecting 65 in the opening menu screen shown in FIG. 2A, which allows the user to add, delete, or change phone numbers and names for a specified area code. The user first types the area code in "Area code:" line 93. The EDIT menu allows the user to display by number or by name by selecting box 95 or 97. Five number-name or name-number pairs are displayed in scrolling list 96.

To add a new pair, the user selects Add box 99 and types the number and name in the "Phone number:" and "Name:" fields 92 and 94 respectively, and presses <Enter> or <Return>. The new number and name appears in order in scrolling list 96.

To change a name and/or number, the user selects Change box 101 and then selects the appropriate pair to be changed from scrolling list 96. The selected pair will be highlighted and the number and name will appear in fields 100 and 102 below the Change box. The user then edits the information in the fields and selects <Enter> or <Return>. The change appears in scrolling list 96. If a mistake is made in entry, the user just selects the number-name pair again and corrects it through the Change option.

A similar method is used to delete a number and name pair. The user selects Delete box 105 and then selects the pair to be deleted in scrolling list 96. The system will query in a popup window whether the user really wants to delete the pair. The user can select "Yes" or "No." If "Yes" is selected, the pair will no longer appear in the scrolling list. The verification pop-up window is not shown here.

A Help option 107 is available on the EDIT menu. Changes to the phone numbers and names can be abandoned at any time by selecting Cancel option 111. To save all changes, the user selects OK option 109.

Figure 2E:
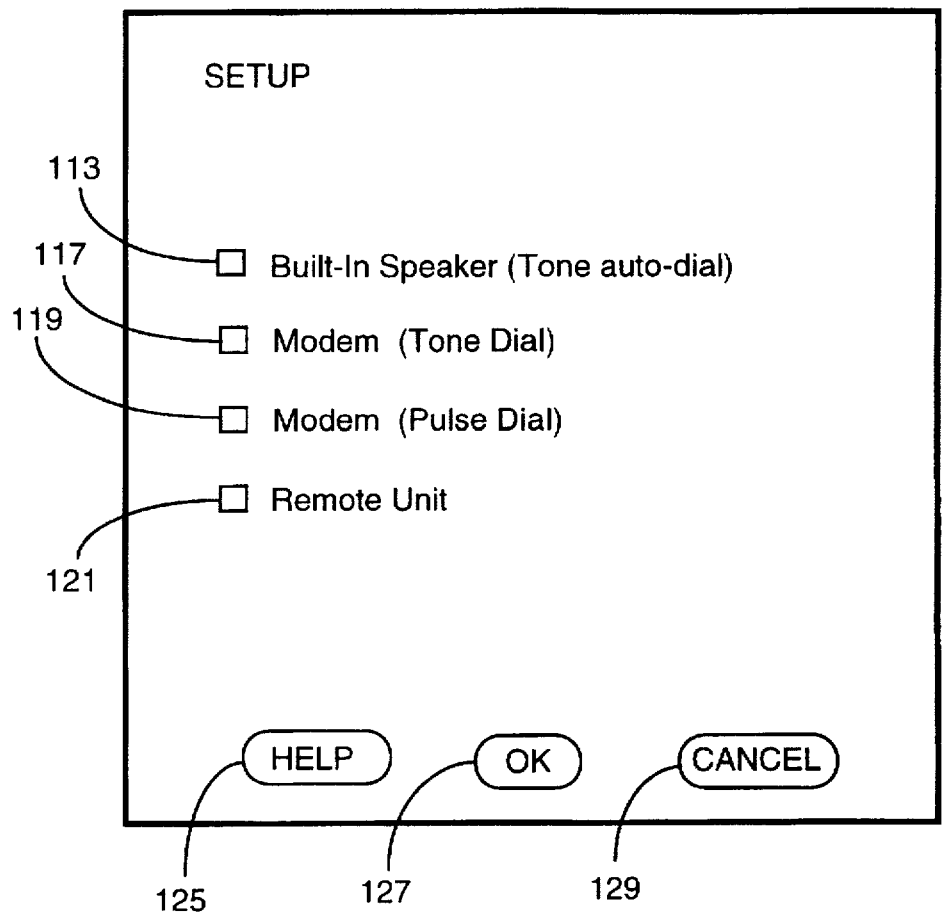
FIG. 2E shows a Setup screen for an embodiment of the invention.

FIG. 2E shows a SETUP screen initiated by selecting menu item 67 in the screen of FIG. 2A, providing a means for the user to define the particular hardware setup he/she will be using in conjunction with the dialer application of the invention. The user can select from three computer-phone configurations. Selecting box 113 sets the mode to use the invention's tone dialer with a computer having a built-in speaker. Selecting box 117 allows the user to use a conventional modem-phone connection with touch-tone dialing; and selecting box 119 allows the user to utilize a conventional modem-phone connection with pulse dialing.

One additional mode, selected by box 121, to be discussed in detail below with reference to FIG. 7, comprises a means to send computer-recognizable code to a computer in a remote location. Help 125, OK 127, and Cancel 129 are available on the SETUP menu.

Figure 3A:
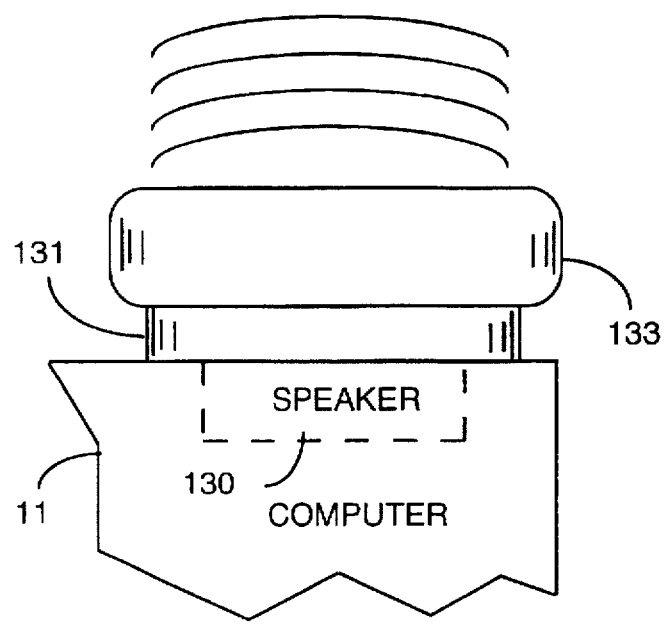
FIG. 3A shows a sound enhancement device for an embodiment of the present invention.
Figure 3B:
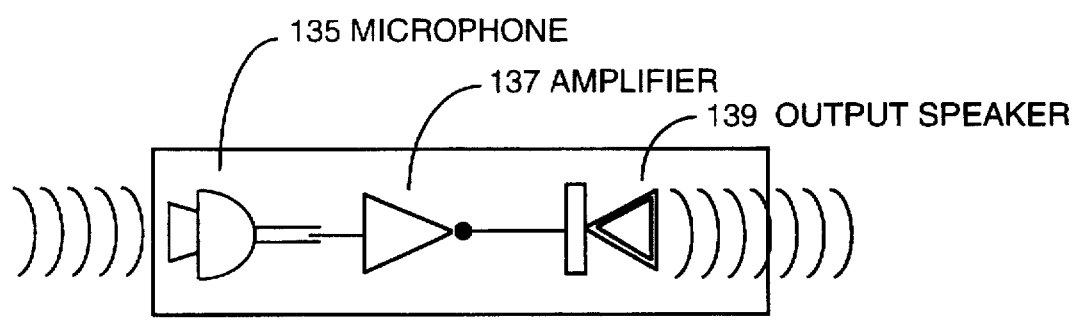
FIG. 3B is a diagram showing internal functional components of the sound enhancement device of FIG. 3A.

Many portable computers have adequate built-in speakers to accomplish the function of the invention, which is to output DTMF tones through a speaker to activate telephone switching equipment. However some computers have inferior quality built-in speakers. An additional embodiment of the invention comprises a sound enhancement device 133 as depicted in FIG. 3A. Device 133 is configured to be placed over the computer's built-in speaker 130. A suction cup interface or other convenient unit 131 may be used between the sound enhancement device and the computer so the device makes a snug fit against the computer's speaker. FIG. 3B is a schematic diagram showing the principal components of the sound enhancement device. The sound enhancement device picks up DTMF tones from the computer speaker tones through a microphone 135, sends the tones through an amplifier circuit 137, and provides enhanced signals to the device's high-quality output speaker 139.

Figure 4:
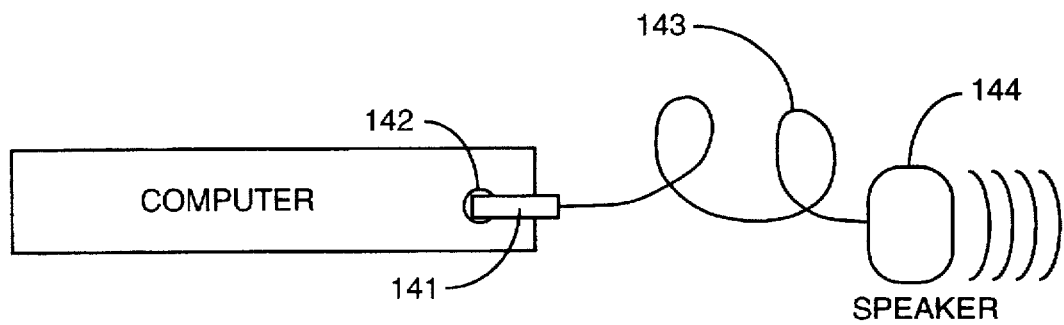
FIG. 4 shows an external speaker attached to a portable computer in an embodiment of the present invention.
Figure 5:
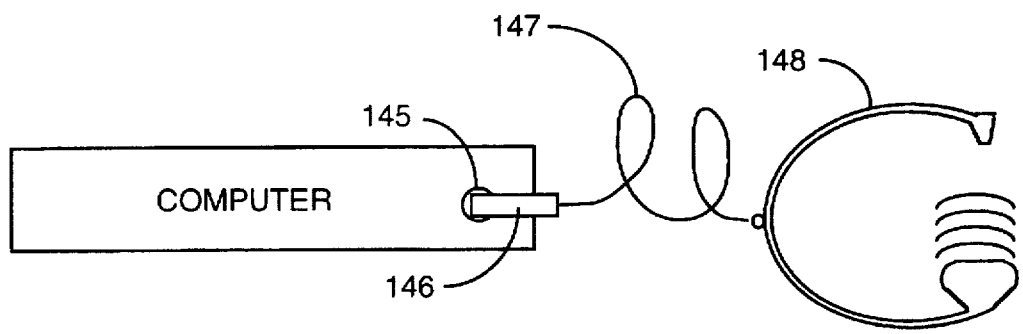
FIG. 5 shows a headset used as an external speaker in an embodiment of the invention.

If the computer does not have a speaker, another embodiment of the invention, shown in FIG. 4, provides an external speaker 144 to be connected with sound jack 141 and cable 143 through the computer's audio output port 142. Alternatively, as shown in FIG. 5, a sound jack 146 and cable 147 could connect a computer's audio output port 145 to a headset attachment 148 to serve as the speaker.

Figure 6:
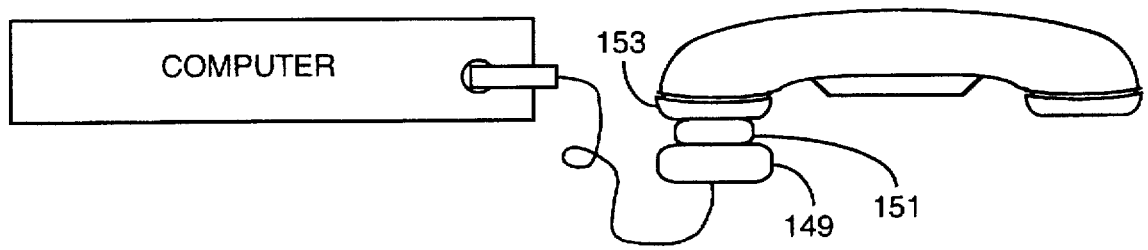
FIG. 6 shows a physical interface for blocking external noise in an embodiment of the present invention.

To block out extraneous noise, a secure fit of the external speaker with the phone mouthpiece is desirable. This can be achieved, as shown in FIG. 6, by adding an interface 151 to external speaker 149 so the speaker can be firmly interfaced to phone mouthpiece 153, thereby mitigating external noise at the interface. This additional feature is desirable when using phones in busy, high noise environments such as airports, conference rooms, or phone booths on a busy street.

Figure 7:
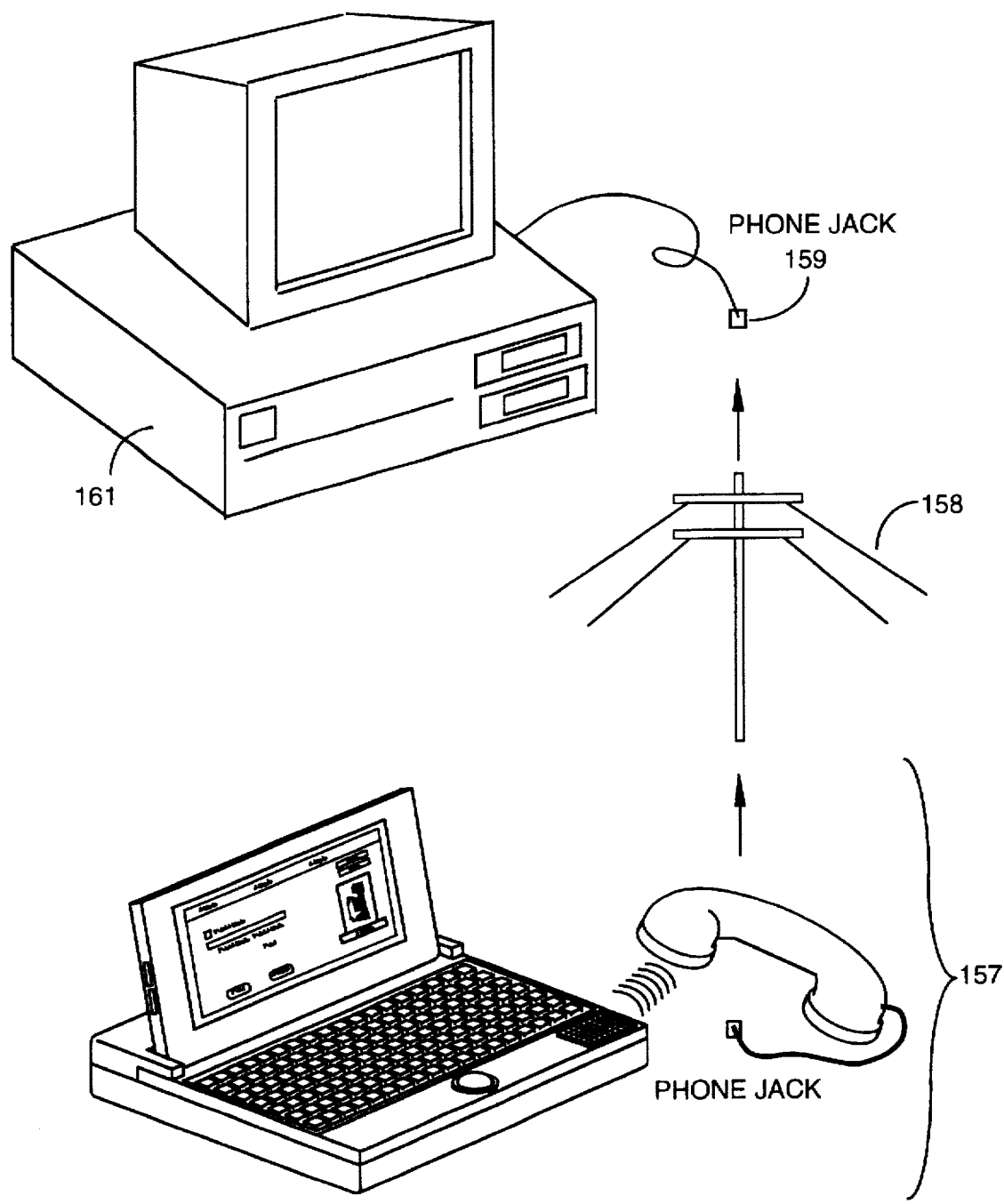
FIG. 7 is a pictorial representation of an embodiment of the present invention comprising coded information transfer from one computer to another.

In a further embodiment, control routines provide a unique means for sending code in DTMF tones from a portable computer and telephone interface 157 as described above, over phone lines 148 to a computer 161 in a remote location, as shown in FIG. 7. The remote unit in this embodiment has decoding ability to accept the DTMF tone-based data from a phone line and translate it into a digital representation interpretable as American Standard Code for Information Interchange (ASCII) computer code. FIG. 8 provides a matrix that shows the DTMF tone values assigned to each character in the ASCII set. A decoder is implemented in the remote unit in this embodiment for receiving input DTMF data. The decoder can be implemented by an add-on card connected to the computer bus and to the phone line by a phone jack 159.

Figure 9:
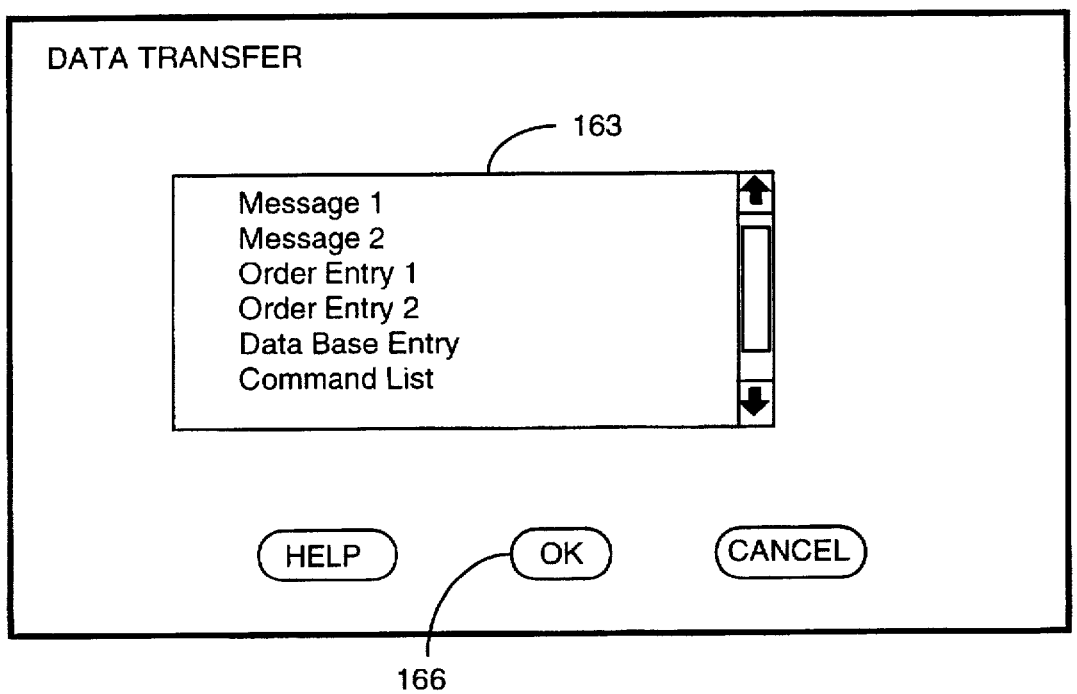
FIG. 9 shows a Data Transfer screen for selecting a data transfer mode from a scrolling list of modes.

In the data-transfer embodiment the user selects box 121 in the screen of FIG. 2E, and the system then displays a selection screen shown in FIG. 9. The selection screen has a scrolling list 163 of formats for data transfer, each unique to a particular purpose. Such formats may be furnished with dialer applications in this embodiment, or, in alternative embodiments, an editor may be provided for creating new applications.

Figure 10:
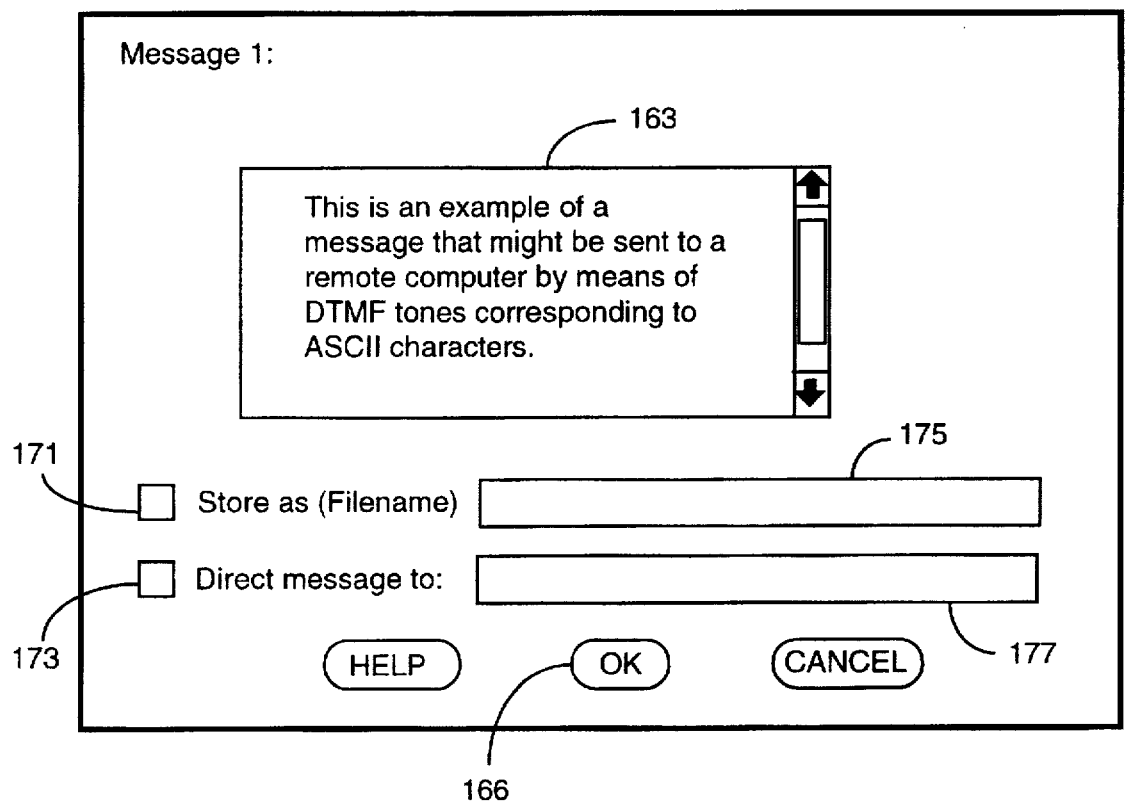
FIG. 10 shows an exemplary message screen for one mode of message operation according to an embodiment of the invention.

An example of a data transfer format is message format 165 in the scrolling list of FIG. 9. To implement this format the user selects the format, which is then highlighted in the scrolling list, and then selects "OK" box 166. The system then displays the message format screen shown in FIG. 10. In this message format, the system provides the user with an active scrolling entry field 167, wherein text may be entered in the manner of a text editor or word processor. There is a check box 171 for activating an entry field 175 to enter a filename for the message, to be stored as that filename at the receiving station. There is additionally a checkbox 173 for activating an entry field 177 to enter a recipient ID or destination for the massage, which may be decoded and used at the receiving end to direct the message to a specific recipient. When the user is satisfied with the text to be sent and other input, selecting "OK" box 169 displays opening menu shown in FIG. 2A. The user simply selects the number and dials as in other embodiments. When the number is dialed and the connection made, if the "Remote Unit" selection is active in the screen shown in FIG. 2E, the system will transfer the text by DTMF code according to the table of FIG. 8.

In this embodiment it is required for successful data transfer that the remote unit have a receiving modem to decode the incoming DTMF tones and provide the resulting data on the receiving computer's bus. The modem has a receiver capable of interpreting two simultaneous DTMF tones, a processor for managing operations, and a look-up table according to FIG. 8, as well as control routines for directing the CPU in managing the modem.

There are an infinite variety of dedicated transfer applications that may be implemented in the data transfer mode of the invention, and the message mode is but one of these. There are many others, such as data entry to databases, such as order forms and the like, that would be equally useful.

It will be apparent to one skilled in the art that there are a relatively large number of changes that may be made in the embodiments described without departing from the spirit and scope of the present invention. Some additions and alternatives have been mentioned above. For example, provisions have been made for a computer without a speaker or one with an inferior quality speaker, where, in the first case, an external speaker attachment is added and, in the second case, the external speaker and phone are interfaced with a special gasket fitting to decrease external noise around the output speaker, thereby improving the quality of the dial signal. Another embodiment extends the invention concept to enable the dialer invention to send computer code over phone lines to a remote computer, as described above. This alternative could feasibly be extended further to provide remote commands and other input to a remote computer to provide a wide variety of tasks. The ASCII/DTMF matrix is also just one of many such matrices that might be used to relate the two forms for data transmission within the spirit and scope of the invention.

What is claimed is:

1. A portable personal computer comprising:
   a CPU;
   a memory coupled to the CPU storing telephone dialing data including area codes, telephone numbers, long-distance carrier access numbers and user credit card numbers;
   a display apparatus coupled to the memory and to the CPU; and
   a speaker;
   wherein, in response to user initiation, the CPU displays an interactive interface on the display apparatus, the interactive interface including selectable identifiers for call destinations and wherein the user selects call destinations, and the CPU generates audio data used to drive the speaker producing a string of audible DTMF tones based on the stored telephone dialing data including selectable long distance carrier access numbers and selectable credit card numbers.

2. A portable personal computer as in claim 1 further comprising manual input apparatus for entering the telephone dialing data.

3. A portable personal computer as in claim 2 wherein the manual input apparatus comprises input fields in the interactive interface.

4. A portable personal computer as in claim 1 wherein the speaker is a built-in speaker.

5. A portable personal computer as in claim 1 wherein the speaker is an add-on speaker connectable to an output port of the portable computer.

6. A portable personal computer as in claim 1 wherein the speaker is a first speaker, and further comprising a tone-enhancement device including a microphone for receiving tones from the first speaker, an amplifier connected to the microphone for enhancing the tones received, and a second speaker connected to the amplifier for providing enhanced DTMF tones from the amplifier.

7. A portable personal computer as in claim 1 wherein control routines for providing the interactive interface and for generating the DTMF tones are implemented on an add-in expansion card.

8. A method for dialing a long-distance credit-card call over a touch-tone telephone system comprising steps of:
   (a) entering telephone dialing data into a memory device of a portable personal computer, the telephone dialing data including area codes, telephone numbers, long-distance carrier access numbers and user credit card numbers;
   (b) associating call destinations with the telephone dialing data in the memory device of the portable personal computer;
   (c) selecting a call destination in an interactive interface presented on a display apparatus of the portable personal computer;
   (c) generating a string of audible dual-tone multi-frequency (DTMF) signals at a speaker from the telephone dialing data associated with the call destination in the memory device of the portable personal computer; and
   (d) using the audible DTMF signals generated by the speaker as input for a microphone input of a telephone device to cause the telephone device to dial the call indicated by the DTMF signals.

* * * * *